(12) United States Patent
Zhang et al.

(10) Patent No.: US 8,205,930 B1
(45) Date of Patent: Jun. 26, 2012

(54) VEHICLE DOOR WITH AN IRREGULAR-CIRCULAR FRAME FOR A RECREATIONAL VEHICLE

(75) Inventors: Liufeng Zhang, Guangxi (CN); Jianshe Chen, Guangxi (CN); Zhaoyu Li, Guangxi (CN); Zaili Liu, Guangxi (CN); Rui He, Guangxi (CN); Wenwen Liu, Guangxi (CN)

(73) Assignee: Liuzhou Wuling Motors Co., Ltd. (CN)

( * ) Notice: Subject to any disclaimer, the term of this patent is extended or adjusted under 35 U.S.C. 154(b) by 0 days.

(21) Appl. No.: 13/151,474

(22) Filed: Jun. 2, 2011

(30) Foreign Application Priority Data

Dec. 3, 2010 (CN) ...................... 2010 2 0641136 U

(51) Int. Cl.
*B60J 10/02* (2006.01)
(52) U.S. Cl. .................... 296/146.2; 296/146.1; 49/507
(58) Field of Classification Search ............... 296/146.1, 296/146.2; 49/507
See application file for complete search history.

(56) References Cited

U.S. PATENT DOCUMENTS

| | | | | |
|---|---|---|---|---|
| 4,667,449 A | * | 5/1987 | Keating et al. .................. 52/213 |
| 5,029,933 A | * | 7/1991 | Gillem ...................... 296/136.11 |
| 5,845,958 A | * | 12/1998 | Rudys et al. ............. 296/136.08 |
| 5,941,593 A | * | 8/1999 | McCann ...................... 296/136.1 |
| 6,070,629 A | * | 6/2000 | Whiteside ...................... 150/166 |
| 6,213,429 B1 | * | 4/2001 | Chu ............................... 244/140 |
| 7,207,197 B2 | * | 4/2007 | North .............................. 68/5 C |
| 7,229,121 B2 | * | 6/2007 | Fox et al. ................. 296/100.16 |
| 7,934,404 B2 | * | 5/2011 | Ha ................................... 68/196 |
| 8,112,904 B2 | * | 2/2012 | Kono et al. ...................... 34/595 |
| 2002/0125730 A1 | * | 9/2002 | Burks et al. ...................... 296/98 |
| 2005/0263988 A1 | * | 12/2005 | Welford ...................... 280/728.3 |
| 2006/0265959 A1 | * | 11/2006 | Renzo .............................. 49/381 |
| 2007/0256459 A1 | * | 11/2007 | Yoon et al. ...................... 68/139 |
| 2008/0245114 A1 | * | 10/2008 | Kang ............................... 68/196 |
| 2009/0066112 A1 | * | 3/2009 | Sharapov .................... 296/136.1 |
| 2009/0320321 A1 | * | 12/2009 | Jergens et al. .................. 34/499 |
| 2010/0031581 A1 | * | 2/2010 | Kang et al. ...................... 49/507 |

FOREIGN PATENT DOCUMENTS

| | | | |
|---|---|---|---|
| JP | 06346665 A | * | 12/1994 |
| JP | 08157167 A | * | 6/1996 |
| JP | 09132987 A | * | 5/1997 |
| JP | 09309681 A | * | 12/1997 |
| JP | 2003321971 A | * | 11/2003 |

* cited by examiner

*Primary Examiner* — Lori Lyjak
(74) *Attorney, Agent, or Firm* — Cantor Colburn LLP

(57) ABSTRACT

Disclosed herein is a vehicle door with an irregular-circular frame for a recreational vehicle. A door window glass of the vehicle door includes a fixed glass (2) and a movable glass (1). The fixed glass (2) is fixedly installed in a portion of the door window surrounded by a lower door body (6), an outer frame (5) and a movable glass guide rail (9). The movable glass guild rail (9) has an arc rail. The movable glass (1) is installed on the lower door body (6) at the center of the arc of the movable glass guide rail (9) via a shaft sleeve and a shaft (4). A lock member (3) with a lock pin is installed on the upper part of the portion where the movable glass (1) engages with the movable glass guide rail (9). A stop block for adjusting the opening degree of the movable glass and stopping the lock pin of the lock member (3) is provided on the movable glass guide rail (9). Compared with the prior art, the vehicle door according to the present invention can solve the difficulty of opening and closing the widow glass of the vehicle door with the irregular-circular frame.

2 Claims, 5 Drawing Sheets

US 8,205,930 B1

VEHICLE DOOR WITH AN IRREGULAR-CIRCULAR FRAME FOR A RECREATIONAL VEHICLE

The present application claims the benefit of priority to Chinese utility model application No. 201020641136.8 titled "A VEHICLE DOOR WITH AN IRREGULAR-CIRCULAR FRAME FOR A RECREATIONAL VEHICLE", filed with the Chinese State Intellectual Property Office on Dec. 3, 2010. The entire disclosure thereof is incorporated herein by reference.

FIELD OF THE INVENTION

This invention relates to automobile manufacturing technologies, particular to a vehicle door made with an irregular-circular frame.

BACKGROUND OF THE INVENTION

A conventional door glass of an automobile may be opened and closed by sliding along a sliding rail upwardly and downwardly. In this technology, it is required that the shape of the vehicle door is adapted to the partitioned shape of a sliding glass and it is also required that the vehicle door has enough sliding space. A big enough sliding glass may be partitioned from the conventional shape of the vehicle door. When the glass slides downwardly along the sliding rail into the lower portion of the door, there is enough space between the inner and outer plates of the vehicle door to receive the glass.

A vehicle door for a recreational vehicle made by the present applicant is significantly different from the conventional vehicle door. In terms of the shape, such vehicle door is of an irregular circular shape, so a big enough glass cannot be partitioned from the door if the common technical solution in which the glass is slid upwardly and downwardly is adopted. Additionally, in terms of the shape, a straight edge is obliquely disposed between the upper half part and the lower half part of the vehicle door, and due to the small thickness of the vehicle door, the space between the inner and outer plates of the lower half part of the vehicle door is very small, so it is very difficult to arrange a existing glass lifting mechanism therein. Therefore, the existing technical solution of lifting glass of the vehicle door cannot solve the problem of opening and closing the glass of the vehicle door with the irregular-circular frame for the recreational vehicle.

SUMMARY OF THE INVENTION

The object of the present invention is to provide a vehicle door with an irregular-circular frame for a recreational vehicle, which can solve the problem that a window glass of the vehicle door with the irregular-circular frame is difficult to be opened and closed.

In order to solve the above-mentioned problem, the vehicle door with the irregular-circular frame for the recreational vehicle includes an irregular-circular outer frame, a door window surrounded by a lower door body and the outer frame, and a door window glass. The door window glass includes a fixed glass and a movable glass. The fixed glass is fixedly installed in the portion of the door window surrounded by the lower door body, the outer frame and a movable glass guide rail. The movable glass guide rail has an arc rail. The movable glass is installed on the lower door body at the centre of the arc of the movable glass guide rail via a shaft sleeve and a shaft. A lock member with a lock pin is installed on the upper part of the portion where the movable glass engages with the movable glass guide rail. A stop block for adjusting the opening degree of the movable glass and stopping the lock pin of the lock member is provided on the movable glass guide rail.

In the above vehicle door with the irregular-circular frame for the recreational vehicle, a plurality of stop blocks may be provided on the movable glass guide rail at different heights, and a lower guide rail for the movable glass is provided within the lower door body.

Compared with the prior art, the present invention has following advantages due to the above-mentioned technical solution.

The present invention may solve the difficulty of opening and closing the glass of the vehicle door with the irregular-circular frame for the recreational vehicle. During being opened and closed, the glass may be moved smoothly without interference and may be safely received in the small space of the lower portion of the vehicle door.

DETAILED DESCRIPTION OF THE EMBODIMENTS

Hereinafter, the structure of the present invention will be described in detail in conjunction with drawings and embodiments.

Figure 1:
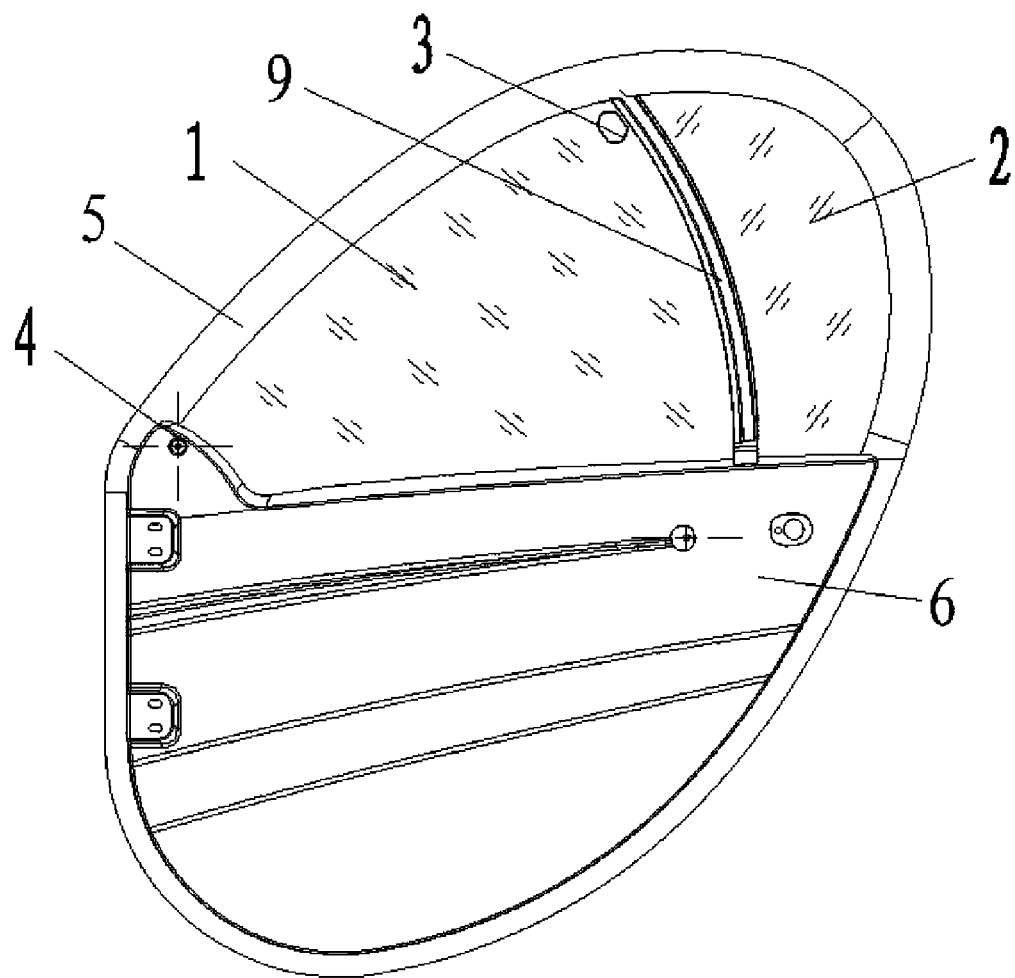
FIG. 1 is a schematic view of the structure of an embodiment according to the present invention.

As shown in FIG. 1, the vehicle door with the irregular-circular frame for the recreational vehicle includes a irregular-circular outer frame 5, a lower door body 6 which is connected with the lower portion of the outer frame 5 and is formed by connecting an inner door plate, an outer door plate and the like, a door window which is surrounded by the top portion of the lower door body 6 and the outer frame 5. A fixed glass 2 is surrounded by the lower door body 6, the outer frame 5 and a movable glass guide rail 9 and is fixedly installed in the door window. An arc grooved rail is provided at one side of the movable glass guide rail 9 opposite to the fixed glass 2. A movable glass 1 is mounted on the lower door body 6 at the centre of the arc of the movable glass guide rail 9 via a shaft sleeve and a shaft 4. A lock member 3 with a lock pin is installed on the upper part of the portion where the movable glass 1 engages with the movable glass guide rail 9.

Figure 2:
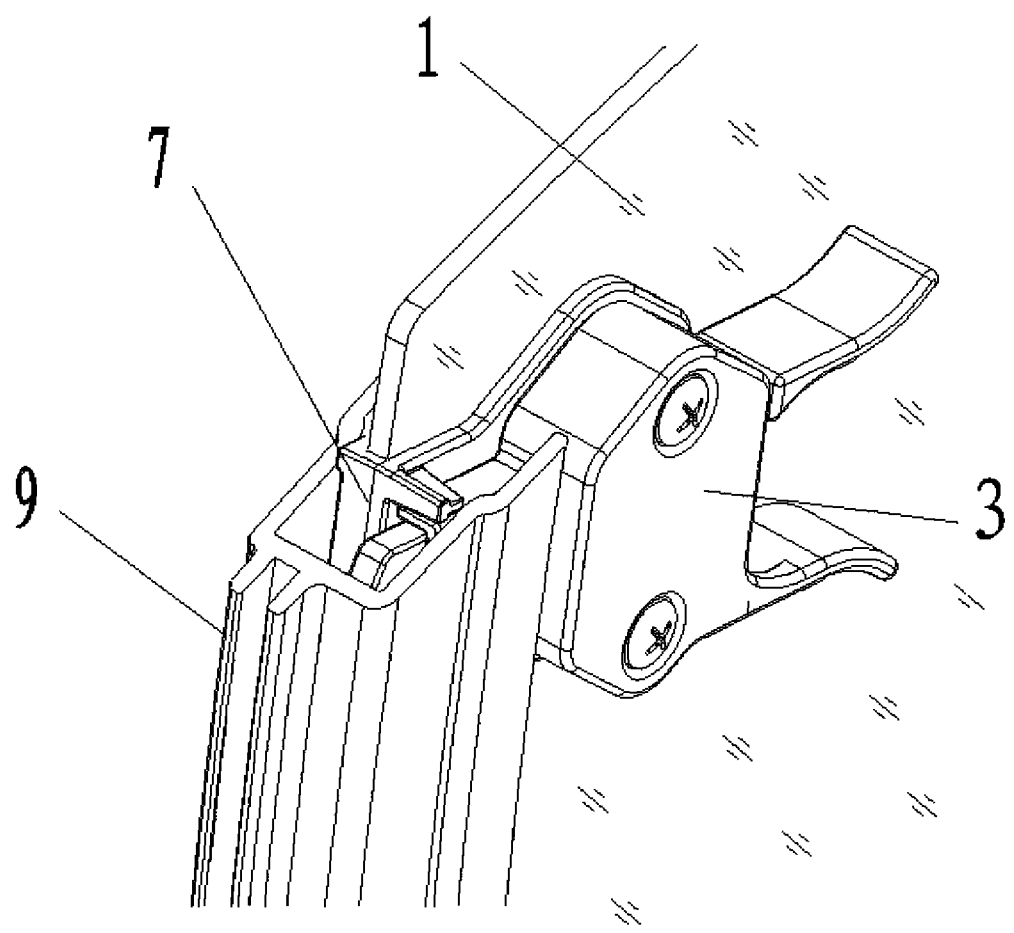
FIG. 2 is a schematic view of the structure of metal components in the embodiment of a vehicle door with an irregular-circular frame for the recreational vehicle.

As shown in FIG. 2, the upper end of the movable glass 1 is installed in the groove of the movable glass guide rail 9 via an upper sliding block 7.

Figure 3:
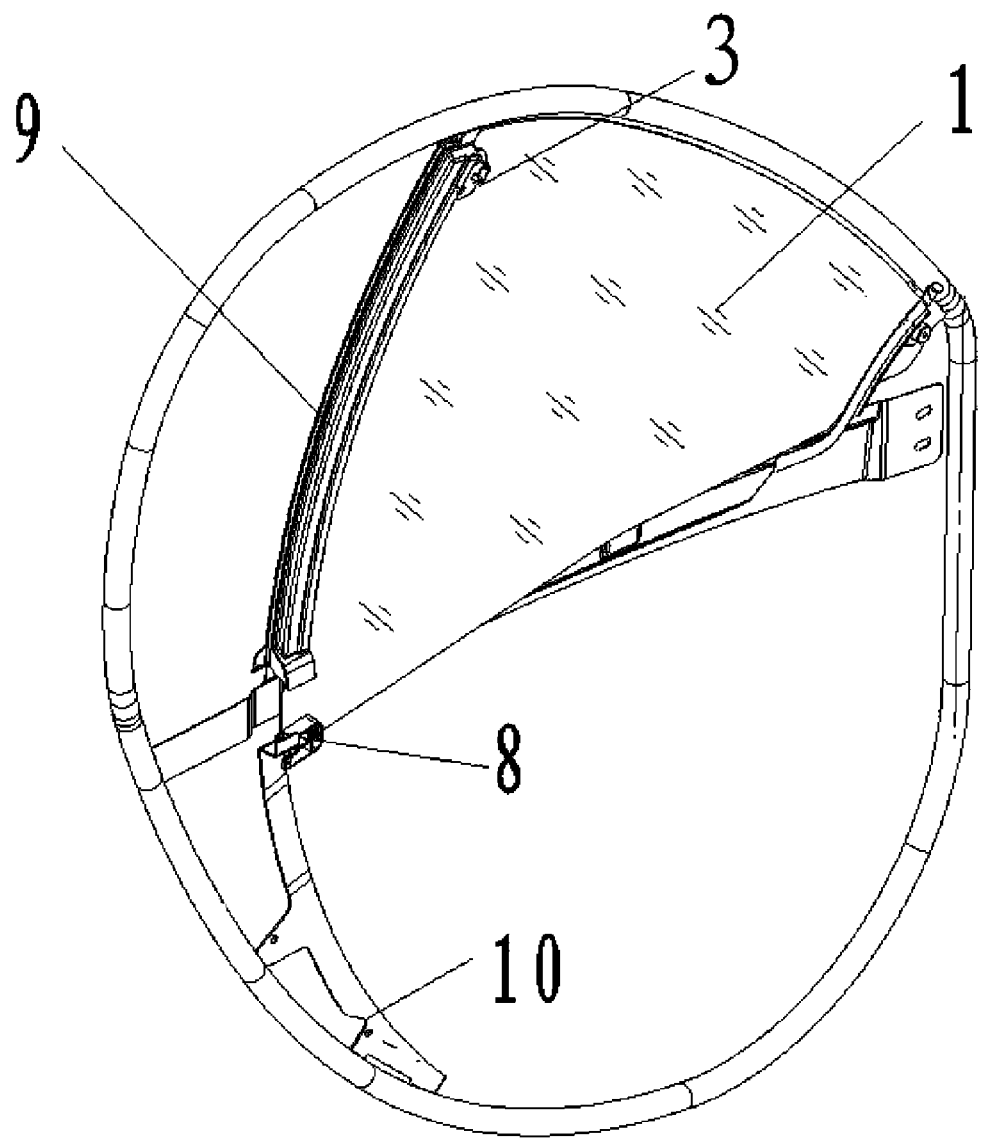
FIG. 3 is a schematic view showing the assembly of the embodiment of the vehicle door with the irregular-circular frame for the recreational vehicle.
Figure 4:
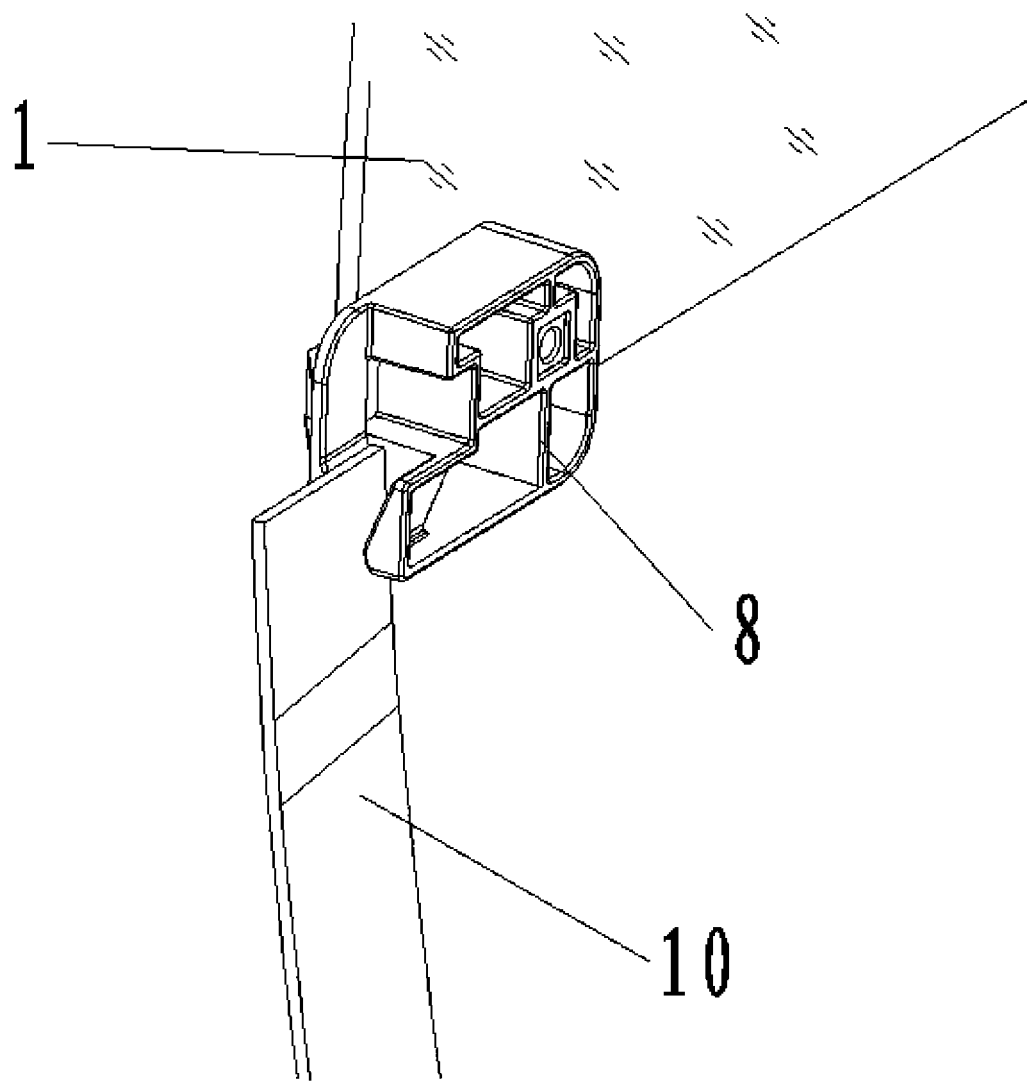
FIG. 4 is a schematic view showing the assembly of a lower sliding block, a movable glass and a lower guide rail.

As shown in FIGS. 3 and 4, a lower guide rail 10 for the movable glass 1 is provided within the lower door body 6, and the lower end of the movable glass 1 is clamped on the sheet-shaped lower guide rail 10 via a lower sliding block 8.

Figure 5:
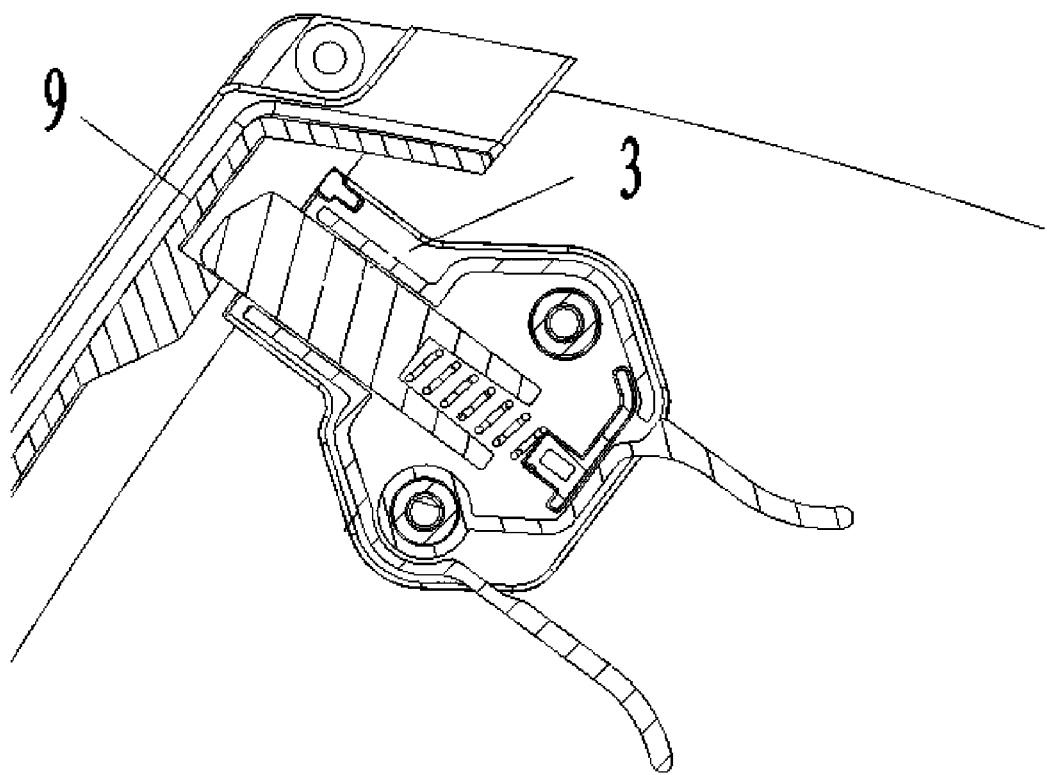
FIG. 5 is a schematic view of the structure of a lock member when its lock pin is stopped by a stop block.

As shown in FIG. 5, the elastic lock pin connected with a handle is provided in the lock member 3. A stop block for adjusting the opening degree, i.e. the lifting height, of the movable glass 1 in the door window and stopping the lock pin of the lock member 3 is provided at the bottom of the groove of the movable glass guide rail 9. It is appreciated that a plurality of stop blocks may be provided at the bottom of the groove of the movable glass guide rail 9.

What is claimed is:

1. A vehicle door with an irregular-circular frame for a recreational vehicle comprising an irregular-circular outer frame, a door window surrounded by a lower door body and the outer frame, and a door window glass, wherein the door window glass comprises a fixed glass and a movable glass, the fixed glass is fixedly installed in a portion of the door window surrounded by the lower door body, the outer frame and a movable glass guide rail, the movable glass guide rail has an arc rail, the movable glass is installed on the lower door body at the centre of the arc of the movable glass guide rail via a shaft sleeve and a shaft, a lock member (3) with a lock pin is installed on the upper part of the portion where the movable glass (1) engages with the movable glass guide rail (9), a stop block for adjusting the opening degree of the movable glass and stopping the lock pin of the lock member is provided on the movable glass guide rail.

2. The vehicle door with the irregular-circular frame for the recreational vehicle according to claim 1, wherein a plurality of the stop blocks are provided on the movable glass guide rail, and a lower guide rail for the movable glass is provided within the lower door body.

\* \* \* \* \*